Feb. 18, 1969 D. R. DEANS 3,428,290
GAS FLOW PROGRAMMERS
Filed April 12, 1966
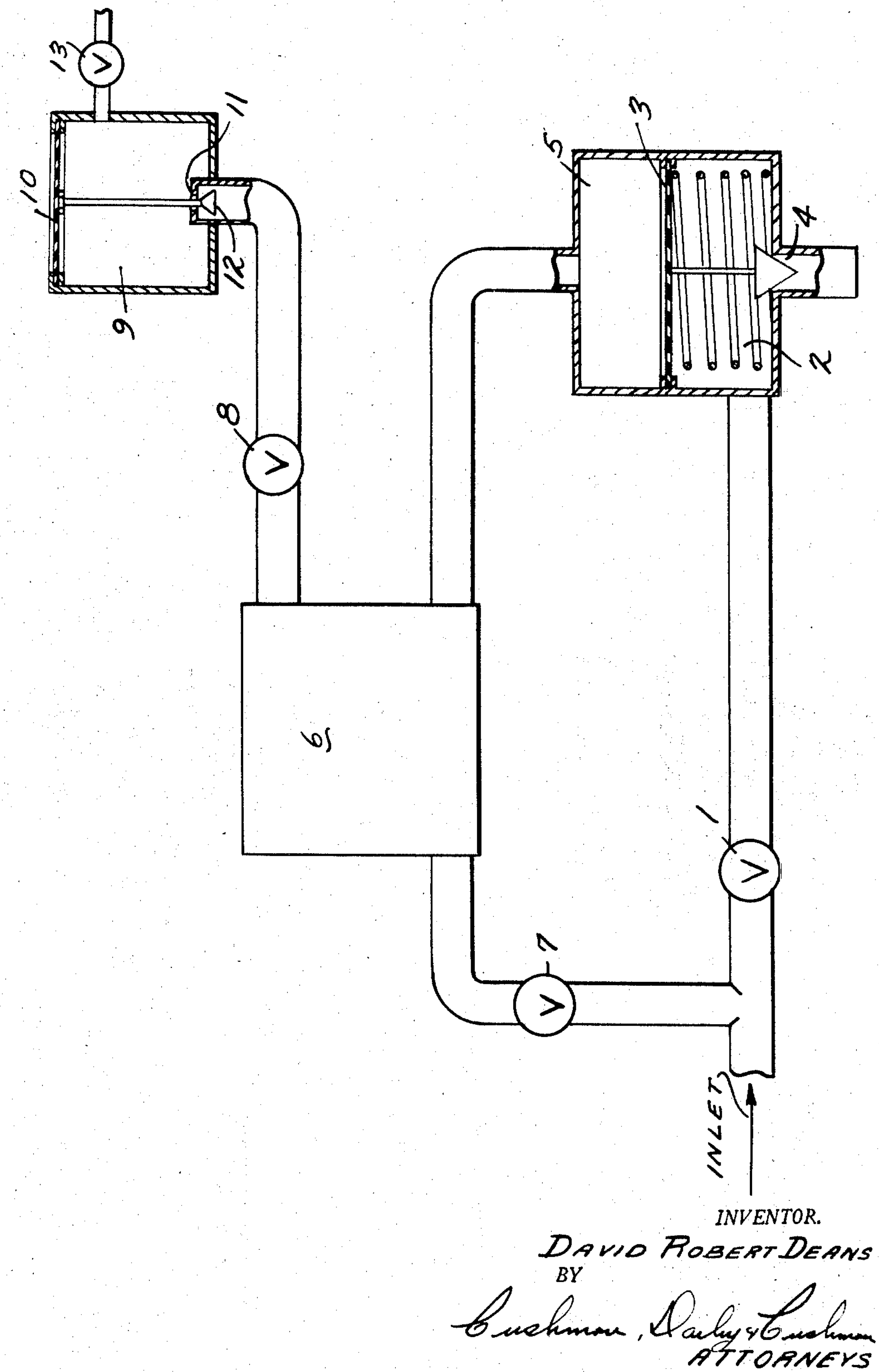
INVENTOR.
DAVID ROBERT DEANS
BY
Cushman, Darby & Cushman
ATTORNEYS United States Patent Office 3,428,290
Patented Feb. 18, 1969

1

3,428,290
GAS FLOW PROGRAMMERS

David Robert Deans, Norton-on-Tees, England, assignor to Imperial Chemical Industries Limited, London, England, a corporation of Great Britain
Filed Apr. 12, 1966, Ser. No. 542,079
Claims priority, application Great Britain, Apr. 15, 1965, 16,269/65
U.S. Cl. 251—28 11 Claims
Int. Cl. F16k 31/12, 17/22

ABSTRACT OF THE DISCLOSURE

A gas flow programmer includes a control zone which provides for a continuous progressive variation in the pressure of gas contained within the control zone, and the continuous variation in gas pressure within the control zone regulates a flow of gas from a constant pressure source. The flow of gas in a passage is regulated by a restriction means which responds to the variation of pressure in the control zone.

This invention concerns gas flow programmers.

According to the present invention there is provided a gas flow programmer which comprises a gas passage having constriction means and restriction means to restrict the flow of gas, the restriction means being controllable by the relative pressure between that in a control zone and that in the gas passage between the constriction means and the restriction means, and means for varying continuously the pressure of gas in the control zone during operation of the programmer.

Programmers according to the invention permit a continuous alteration in the rate of flow of gas through the gas passage from a constant pressure source at the inlet.

Gas flow rates referred to in this specification are defined in terms of the number of moles of gas passing per unit time.

The constriction means may be a constricted portion of the passage, but if it is desired to vary the flow characteristics of the apparatus, it may be an adjustable valve such as a needle valve. The constriction means may also be a barrier closing the passage but permeable to the gas to be flowed through it, as, in general, this type of constriction gives a nearly linear relationship between the pressure difference across the constriction means and the rate of gas flow through it.

The restriction means is preferably adjustable to operate at a range of pressure differences; for example, a valve of the adjustably spring loaded piston or diaphragm operated type may be used.

It is preferred that the control zone should be of large volume to facilitate accurate control of the variation in the pressure of the gas in it. Control zones of from 50 mls. to 5 litres are normally suitable for chromatographic applications using normal valves.

According to a further form of the invention there is provided a gas flow programmer in which means is provided for filling the control zone with gas at the same pressure as that at the inlet side of the constriction means before the operation of the programmer, and means is provided for allowing the gradual controlled escape of gas from the control zone during operation of the programmer.

This form of the invention provides programmers in which a steadily increasing rate of gas flow may be provided without the use of a system of taps programmed to open in sequence and without the discontinous increases in flow which normally result from opening successive taps. It is of particular value in gas chromatography.

It is found in gas chromatography that if mixtures of

2 which the components have widely separate boiling points are to be analysed, the light components pass through the chromatographic column rapidly and are shown by the usual detection and recording apparatus as sharp peaks, whereas the heavy components pass through slowly and are shown as diffuse peaks from which it is difficult to estimate the quantity of the heavy component which is present. If a succession of gas flow rates of steadily increasing magnitudes is applied to the column the peaks corresponding to the heavy components become sharp and the components pass through more rapidly, but with many types of detection and recording apparatus any components which are emerging at the time when the flow rate is increased cannot be estimated satisfactorily. Although a succession of constant gas rates of this type reduces the difficulties previously mentioned, during each period of constant flow rate the earlier components separate more sharply than the later ones.

By employing a steadily increasing rate of gas flow, as may be provided by gas flow programmers according to this invention, these difficulties are avoided and determination of the quantities of materials passing out of the column may be carried out by conventional means.

The means for filling the control zone with gas in this form of the invention may be a simple passage leading from the inlet side of the constriction means to the control zone, which passage is closable by a tap. The means for allowing the gradual escape of gas from the control zone may be a small hole or a tube having a constricted portion. Preferably however the means for allowing the gradual escape of gas is a valve such as a needle valve which permits adjustment of the gas escape rate.

In apparatus of this type, the gas flow increases continuously but at a gradually declining rate of increase, reaching a maximum value when the escape of gas from the control zone ceases.

Control in apparatus of this type may be provided by allowing the steady introduction to the control zone of gas from the inlet side of the constriction means and allowing a slightly greater rate of loss of gas from the control zone during operation of the programmer.

In a preferred form of the invention, there is provided as means for allowing the gradual escape of gas from the control zone, a constant flow controller (i.e. a controller which permits the escape of constant numbers of moles of gas in equal times) and to employ in the means for filling the control zone a similar constant flow controller which permits ingress of gas to the control zone at a lower rate than that of the egress of the gas from the said zone, or an on/off valve.

In this preferred form of the invention the rate of increase in the flow rate may be kept substantially constant for significant periods if the control zone has a large volume and the constriction means passes gas at a rate proportional to the pressure drop across it.

Constant flow controllers for use in this form of the invention may comprise a gas passage having constriction means, and a valve at the inlet to the passage which is controlled by a pressure difference between the inlet side of the said means and its outlet side, to maintain the said pressure drop at a steady value.

The constriction means of the constant flow controller may comprise an adjustable valve, to permit variation in the slope of the graph of gas flow through the programmer against time.

A specific form of the invention will now be described with reference to the drawing, though the invention is not limited thereto.

A first gas pipe leads from an inlet through a first needle valve 1 to a chamber 2 (herein referred to as the restriction chamber) in a fine control valve the roof of which consists of a diaphragm 3 which is urged upwards by a helical spring and which chamber has an outlet 4 for gas in its base, the outlet from the restriction chamber being closable by a member carried by the diaphragm when the diaphragm is flexed downwards.

The upper surface of the diaphragm forms the bottom wall of a control chamber 5 which is connected by a permanently open pipe to a capacity vessel 6 which is in turn connected by a pipe which is closable by an on/off valve 7 to a point on the inlet side of the first needle valve. A further pipe leads from the capacity vessel to the atmosphere through an on/off valve 8 and a constant downstream pressure flow controller which comprises an inlet chamber 9 of which one wall is a diaphragm 10 which is exposed to atmospheric pressure on its outside, the inlet 11 to the chamber being controlled by a valve 12 which is connected to the diaphragm so as to close the inlet when there is a predetermined positive pressure in the chamber, an outlet from the chamber leading through a needle valve 13 (the second valve) to the atmosphere.

The apparatus is operated as follows.

The on/off valve 7 between the capacity vessel 6 and the inlet side of the first needle valve 1 is opened and the on/off valve 8 between the capacity vessel and the constant down-stream pressure flow control is closed.

A source of gas of substantially constant pressure is connected to the inlet of the first gas pipe and gas flows into the capacity vessel 6 and the control chamber 5 until the pressure therein is equal to that of the gas source. The on/off valve 7 connecting the capacity vessel to the inlet side of the first needle valve 1 is then closed. Gas has begun to flow through the first needle valve 1 to the restriction chamber 2 in the fine control valve and after a short time a constant rate of flow of gas from the first gas pipe is established.

The on/off valve 8 between the capacity vessel 6 and the constant down-stream pressure flow controller is then opened and the pressure in the capacity vessel declines substantially linearly with time as a constant flow of gas to the atmosphere takes place. As the pressure in the capacity vessel declines, the pressure in the control chamber 5 similarly declines and the rate of flow through the first gas pipe increases substantially linearly.

I claim:

1. A gas flow programmer which comprises a gas passage having an inlet and an outlet; constriction means between the inlet and outlet; restriction means at the outlet for restricting the rate at which gas can escape from the outlet; a control zone; and means to provide a progressive continuous variation in the pressure of gas contained in the control zone while the programmer is being operated; the restriction means being responsive to the pressure difference between the control zone and the outlet side of the said constriction means so as to restrict the rate at which gas can escape from the outlet to thereby maintain the said pressure difference at a steady value.

2. A gas flow programmer according to claim 1 in which the constriction means is an adjustable valve.

3. A gas flow programmer according to claim 1 in which the constriction means is a barrier closing the passage but permeable to the gas to be flowed through it.

4. A gas flow programmer according to claim 1 in which the restriction means is adjustable to operate at a range of pressure differences.

5. A gas flow programmer according to claim 1 in which means is provided for filling the control zone with gas at the same pressure as that at the inlet side of the constriction means before operation of the programmer, and including means for allowing the gradual controlled escape of gas from the control zone to provide said progressive continuous variation in the pressure of gas contained within the control zone.

6. A gas flow programmer according to claim 5 in which the means for filling the control zone with gas at the same pressure as that at the inlet side of the constriction means is a passage leading from the inlet side of the constriction means to the control zone, which passage is closable by a tap.

7. A gas flow programmer according to claim 5 in which the means for allowing the gradual escape of gas from the control zone is a valve which permits adjustment of the rate of gas escape.

8. A gas flow programmer according to claim 5 in which means is provided for allowing the steady introduction to the control zone of gas from the inlet side of the constriction means and allowing a slightly greater rate of loss of gas from the control zone.

9. A gas flow programmer according to claim 1 which comprises means for allowing the gradual escape of gas from the control zone which is a constant gas flow controller and wherein means for filling the control zone comprises an on/off valve.

10. A gas flow programmer according to claim 9 in which the constant flow controller comprises a gas passage constrictable by an adjustable valve; and a valve at the inlet to the passage controlled by a pressure difference between the inlet side of the adjustable valve and the outlet side of said adjustable valve to maintain the said pressure difference at a steady value.

11. Apparatus for gas chromatography which comprises, as a means of programming the flow of gas through it, a gas flow programmer according to claim 1.

References Cited

UNITED STATES PATENTS 1,685,205 9/1928 Stein ------------- 251—37 X

ARNOLD ROSENTHAL, *Primary Examiner.*

U.S. Cl. X.R.

251—37